No. 641,072. Patented Jan. 9, 1900.
H. BRIGGS.
APPARATUS FOR MOLDING CUPS OR LIKE ARTICLES OF CLAY OR OTHER PLASTIC MATERIAL.
(Application filed Feb. 16, 1899.)
(No Model.) 2 Sheets—Sheet 1.
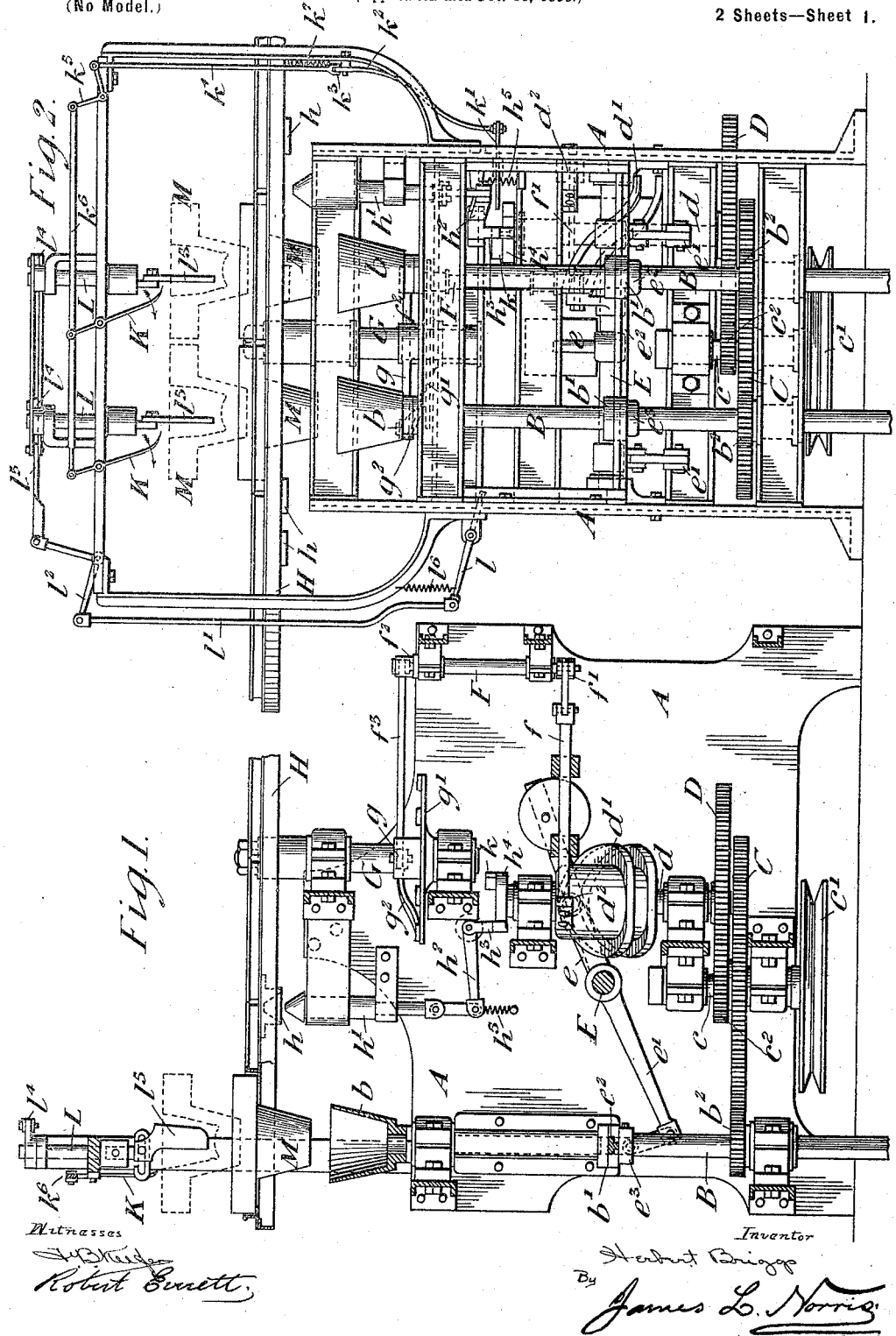

No. 641,072. Patented Jan. 9, 1900.
H. BRIGGS.
APPARATUS FOR MOLDING CUPS OR LIKE ARTICLES OF CLAY OR OTHER PLASTIC MATERIAL.
(Application filed Feb. 16, 1899.)
(No Model.) 2 Sheets—Sheet 2.
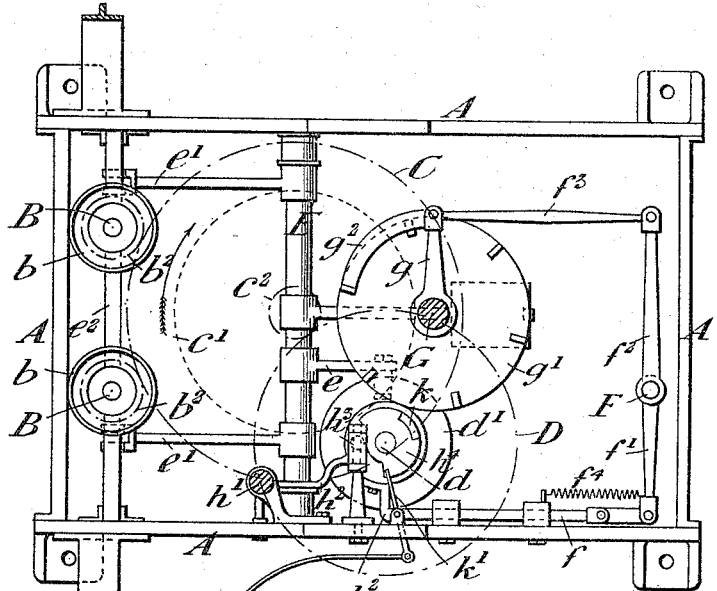
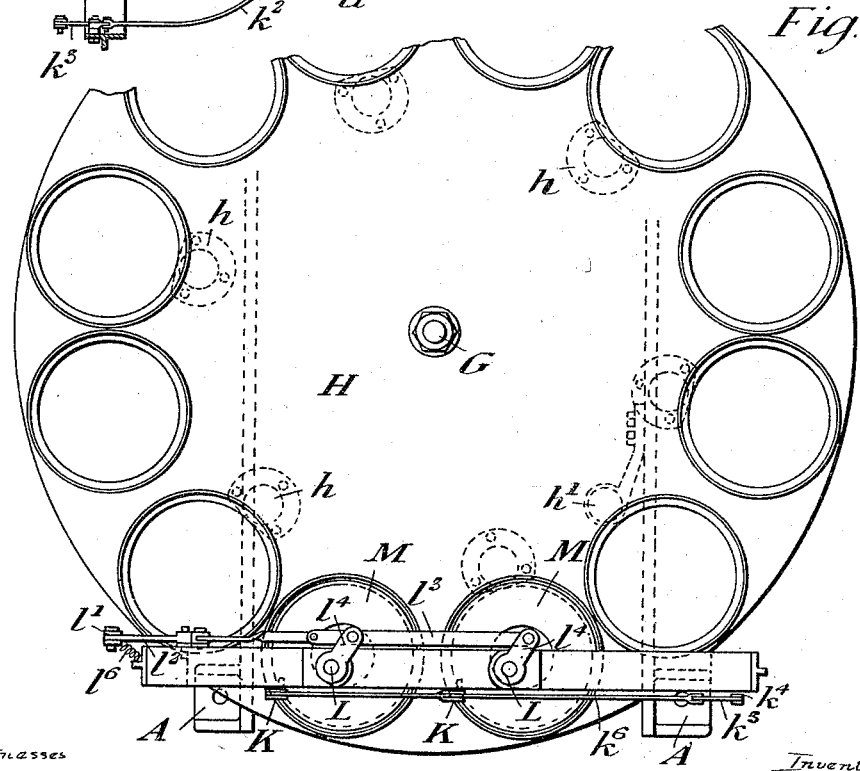

UNITED STATES PATENT OFFICE.

HERBERT BRIGGS, OF STOKE-UPON-TRENT, ENGLAND.

APPARATUS FOR MOLDING CUPS OR LIKE ARTICLES OF CLAY OR OTHER PLASTIC MATERIAL.

SPECIFICATION forming part of Letters Patent No. 641,072, dated January 9, 1900.

Application filed February 16, 1899. Serial No. 705,670. (No model.)

*To all whom it may concern:*

Be it known that I, HERBERT BRIGGS, a citizen of England, residing at Oakhill Hall, Stoke-upon-Trent, in the county of Stafford, England, have invented certain new and useful Improvements in Apparatus for Molding Cups or Like Articles of Clay or other Plastic Material, (for which I have applied for a patent in Great Britain, dated November 22, 1898, No. 24,659,) of which the following is a specification.

This invention relates to apparatus for molding clay cups and like articles, as will be described with reference to the accompanying drawings.

Figure 1 is a vertical section, and Fig. 2 is a front elevation, of a molding-machine according to this invention. Fig. 3 is a plan, the table being supposed to be removed; and Fig. 4 is a part plan of the table.

On a framing A are provided bearings in which two spindles B can revolve and slide vertically. Each spindle has at its top a cup $b$, about its middle a collar $b'$, and near its lower end a toothed pinion $b^2$, which has a key sliding in a groove of the spindle, so that while the spindle can slide through the pinion it must revolve with it. Both the pinions gear with a wheel C on a spindle $c$, which is driven by a band on a pulley $c'$ or otherwise from any suitable motor. On the spindle $c$ is fixed a pinion $c^2$, which gears with a wheel fixed on a vertical spindle $d$, which revolves at a speed from a thirtieth to a fortieth of the speed of the spindle B. On the spindle $d$ is fixed a barrel-cam $d'$, in the groove of which is engaged a roller mounted on the arm $e$ of a rocking shaft E, having two longer arms $e'$, linked to a bar $e^2$, on which the collars $b'$ of the two spindles B rest, these spindles having below the bar $e^2$ washers $e^3$ fixed on them by setting-screws or otherwise. By means of the cam $d'$, the arms $e'$, and $e'$ and the bar $e^2$ the two spindles B are raised and lowered during revolution of the cam. On the upper cylindrical portion of the cam $d'$ is an upwardly-projecting stud $d^2$, which once in every revolution of the cam pushes a guided rod $f$, linked to an arm $f'$ of a vertical rocking shaft F, another arm $f^2$ of which is connected by a link $f^3$ to a radial arm $g$, free to turn on a vertical spindle G. On this spindle is fixed a wheel $g'$, having six upwardly-projecting teeth, and on the end of the arm $g$ is pivoted a spring-pawl $g^2$, adapted to engage with these teeth. Thus at each revolution of the stud $d^2$ the pawl $g^2$ moves the wheel $g'$ one tooth around. The pawl is caused to retreat by a spring $f^4$. On the upper end of the spindle G is fixed a circular table H, which has twelve holes through it. On the under side of the table are fixed six equidistant pieces $h$, each formed with a conical recess to receive the round end of a vertically-sliding rod $h'$, which is linked to one arm, $h^2$, of a bell-crank lever, the other short arm, $h^3$, of which is acted on by a cam $h^4$, fixed on the vertical spindle $d$. This cam is so set that just after the wheel $g'$ is turned one tooth around, the table H being thus turned through one-sixth of a revolution, the rod $h'$ is raised, so that its conical head enters the recess of one of the pieces $h$, thus adjusting the table accurately and holding it firmly in position until the arm $h^3$ is clear of the cam $h^4$, when a spring $h^5$ retracts the rod $h'$, leaving the table free to be again turned one-sixth around. On the cam $h^4$ is an upwardly-projecting tooth $k$, which once in every revolution acts on a lever $k'$. This is connected by rod $k^2$, bell-crank $k^3$, rod $k^4$, bell-crank $k^5$, and rod $k^6$ with two levers K, the lower ends of which terminate as bent wires. Thus once in every revolution of the cam $h^4$ the two levers K are simultaneously caused to make a stroke in the direction of the arrows, their return to the position shown being effected by a spring $k^7$.

As the bar $e^2$ reaches the upper end of its stroke it raises one arm of a lever $l$, which is connected by rod $l'$, bell-crank $l^2$, and rod $l^3$ to two arms $l^4$, each fixed on the upper end of a vertical spindle L. Each of these spindles is fitted to revolve in a bearing which is eccentric to the axis of the vertical spindle B, and it carries a blade or former $l^5$, adjustably clamped on its lower end. Thus when the bar $e^2$ is completing its upstroke it causes the spindle L, with the formers $l^5$, to turn about a quarter of a revolution around. When the bar $e^2$ descends, the spindles L are caused to turn back by a spring $l^6$.

A number of molds M being provided, each having its interior of the shape of the exterior of the article to be molded, several of these molds, each having in it a piece of suitable clay or other plastic material, are placed on the table on which the flanges of the molds rest, their lower parts projecting through the holes of the table. Two of the molds which are immediately above the spindles B as these spindles ascend become engaged in the cups at the tops of these spindles and rise and revolve with them, bringing the plastic material up to the formers $l^5$, which at first are at some distance from the interior surface of the molds, but as they are turned on their eccentric axes approach that surface molding the material to the desired shape, which is determined externally by the shape of the mold and internally by the shape and adjustment of the former. The ends of the levers K being brought to bear on the lips of the molded articles clear them of loose or superfluous material. The spindles B then descend, leaving the molds resting on the table, which thereupon is turned partly around, bringing another pair of molds to position over the spindles, while those containing the molded articles are removed. Thus by bringing charged molds successively to the table and removing those which have passed the position over the spindles B the molding of successive cups or like articles can be carried on in a continuous manner.

Although two spindles B are described, obviously the machine could be arranged with only one or with more than two spindles.

Having thus described the nature of this invention and the best means I know of carrying the same into practical effect, I claim—

1. In a molding-machine, the combination with a rotatable table carrying a plurality of molds, of an oscillating former arranged above the table, a vertical spindle disposed beneath the table, means for imparting an intermittent rotary movement to the table to successively bring the molds above the spindle and beneath the former, means for adjusting the former laterally, and means for imparting a combined rotary and vertical movement to the spindle to rotate and raise the molds up to the former, substantially as described.

2. In a molding-machine, the combination with a rotatable table provided with a plurality of sockets disposed in an annular series, of molds disposed in said sockets and each provided with a peripheral flange arranged to rest on the table, an oscillating former arranged above the table, means for imparting intermittent rotary movement to the table to successively bring the molds eccentrically beneath the axis of the former, and means for successively lifting the molds from their seats and raising them about the former, substantially as described.

3. In a molding-machine, the combination with a rotatable table provided with a plurality of sockets and molds removably seated in said sockets, of an oscillating former arranged above the table, means for imparting intermittent rotary movement to the table to successively bring the molds eccentrically beneath the axis of the former, a vertically-movable cup arranged beneath the table, and means for imparting a combined rotary and vertical movement to said cup to raise the molds successively up to the former and rotate them about the latter, substantially as described.

4. In a molding-machine, the combination with a rotatable table provided with a plurality of sockets and molds removably seated in said sockets, of an oscillating former arranged above the table, a vertical spindle arranged beneath the table, means for imparting an intermittent rotary movement to the table to successively bring the molds above the spindle and eccentrically beneath the axis of the former, and means for imparting a combined rotary and vertical movement to the spindle to rotate and raise the molds up to the former, substantially as described.

5. In a molding-machine, the combination with a rotatable table provided with a plurality of sockets and molds removably seated in said sockets, of an oscillating former arranged above the table, a vertical spindle arranged beneath the table, means for imparting intermittent rotary movement to the table to successively bring the molds above the spindle and eccentrically beneath the axis of the former, means for imparting a combined rotary and vertical movement to the spindle to rotate and raise the molds up to the former a pivoted scraper arranged above the table, and means for oscillating said scraper successively across the upper ends of the molds, substantially as described.

6. In a molding-machine, the combination with a rotatable table provided with a plurality of sockets and molds removably seated in said sockets, of an oscillating former arranged above the table, a vertical spindle arranged beneath the table and provided at its upper end with a cup, means for imparting intermittent rotary movement to the table to successively bring the molds above the cup and eccentrically beneath the axis of the former, and means for imparting a combined rotary and vertical movement to the spindle to rotate and raise the cup and a contained mold up to the former, substantially as described.

7. In a molding-machine, the combination with a rotatable table provided with a plurality of sockets and molds removably seated in said sockets, of a vertical rock-shaft arranged above the table and provided at its lower end with an adjustable former, means for rocking said shaft, means for imparting intermittent rotary movement to the table to successively bring the molds eccentrically beneath the axis of the former, a vertical spindle arranged beneath the table and provided at its upper end with means for holding the molds one at a time, and means for imparting a combined rotary and vertical movement to the spindle, substantially as described.

In testimony whereof I have hereunto set my hand in presence of two subscribing witnesses.

HERBERT BRIGGS.

Witnesses:
GERALD L. SMITH,
C. S. HOPKINS.